US006751810B1

(12) United States Patent
Prendergast

(10) Patent No.: US 6,751,810 B1
(45) Date of Patent: Jun. 22, 2004

(54) SHROUD PLATE

(75) Inventor: Jonathon R. Prendergast, Newport Beach, CA (US)

(73) Assignee: Norotos, Inc., Santa Ana, CA (US)

(*) Notice: Subject to any disclaimer, the term of this patent is extended or adjusted under 35 U.S.C. 154(b) by 0 days.

(21) Appl. No.: 10/389,648

(22) Filed: Mar. 13, 2003

(51) Int. Cl.[7] .................................................. A42B 1/24

(52) U.S. Cl. ........................... 2/422; 2/6.2; 248/222.13; 403/321

(58) Field of Search ...................... 2/6.2, 422; 403/321, 403/325, 326; 359/409, 815; 248/222.11, 222.13, 221.11, 222.51, 224.7

(56) References Cited

U.S. PATENT DOCUMENTS

| | | | | |
|---|---|---|---|---|
| 846,022 A | * | 3/1907 | Ficener | 248/222.13 |
| 1,226,101 A | | 5/1917 | Marsden | |
| 2,284,180 A | | 5/1942 | Thomas | |
| 4,449,787 A | | 5/1984 | Burbo et al. | |
| 4,553,873 A | | 11/1985 | Salice | |
| 4,671,697 A | * | 6/1987 | Ando et al. | 403/325 |
| 4,689,834 A | | 9/1987 | McCarthy et al. | |
| 4,697,783 A | | 10/1987 | Kastendieck et al. | |
| 4,734,939 A | * | 4/1988 | Copp | 2/6.2 |
| 4,987,608 A | | 1/1991 | Cobb | |
| 5,176,342 A | | 1/1993 | Schmidt et al. | |
| 5,179,735 A | | 1/1993 | Thomanek | |
| 5,226,181 A | | 7/1993 | Polednak et al. | |
| 5,331,684 A | | 7/1994 | Baril et al. | |
| 5,339,464 A | | 8/1994 | Dor | |
| 5,347,119 A | | 9/1994 | Connors | |
| 5,408,086 A | | 4/1995 | Morris et al. | |
| 5,467,479 A | | 11/1995 | Mattes | |
| 5,469,578 A | | 11/1995 | Mattes | |
| 5,471,678 A | | 12/1995 | Dor | |
| 5,506,730 A | | 4/1996 | Morley et al. | |
| 5,542,627 A | | 8/1996 | Crenshaw et al. | |
| 5,581,806 A | | 12/1996 | Capdepuy et al. | |
| 5,648,862 A | | 7/1997 | Owen | |
| 5,703,354 A | | 12/1997 | Wannagot et al. | |
| 5,822,126 A | * | 10/1998 | Cursolle et al. | 359/630 |
| 5,914,816 A | | 6/1999 | Soto et al. | |
| 6,249,386 B1 | * | 6/2001 | Yona et al. | 359/630 |
| 6,457,179 B1 | | 10/2002 | Prendergast | |
| 6,472,776 B1 | | 10/2002 | Soto et al. | |
| 2003/0196355 A1 | * | 10/2003 | Castro | 248/222.11 |

* cited by examiner

*Primary Examiner*—Rodney M. Lindsey
(74) *Attorney, Agent, or Firm*—Christie, Parker & Hale, LLP

(57) ABSTRACT

The present invention provides for a shroud plate for headgear comprising a shell, an insert, a lock and a release mechanism wherein the shell extends around at least a portion of the insert has a smooth surface with rounded edges and corners and is shaped to match the contour of the headgear. Further, the insert is adapted to receive a lock plate, the lock is adapted to secure the lock plate to the insert, and the release mechanism allows for removal of the lock plate from the insert.

20 Claims, 8 Drawing Sheets

12 10 13

10 14 34 14 14 28 33 33 26 30

10
13
12

SHROUD PLATE

FIELD OF THE INVENTION

This invention relates to helmet attachment mechanisms used with mounting assemblies for night vision devices, and more particularly to a shroud plate which may act as an interface between a helmet and the helmet mount for a night vision device.

BACKGROUND OF THE INVENTION

Night vision devices are commonly used by military personnel for conducting operations in low light or night conditions. The night vision devices used by the military typically include image intensifier tubes and associated optics that convert infrared and near infrared light into viewable images. A common night vision device currently being used in the U.S. Army is the PVS7 night vision goggle, manufactured by ITT Corporation of Roanoke, Va.

Assemblies for mounting night vision devices to a helmet are well-known in the art. These mounting assemblies allow a user's hands to remain free while viewing a scene through the night vision device. It is also desirable for these mounting assemblies to be removable from the helmet so that they do not interfere with a user's actions when they are not needed, such as during the daytime or when a user parachutes from an airplane.

A night vision device may be attached to a helmet through a helmet attachment mechanism which acts as an interface between a helmet mount and the helmet. In previous designs, helmet attachment mechanisms have been attached to a helmet by a strap secured around the helmet. See, for example, U.S. Pat. No. 6,472,776 to Soto et al. However, in such mechanisms, the strap and helmet attachment mechanism is not permanently attached to the helmet, and may be susceptible to being lost during a maneuver or simply being misplaced. Alternatively, fasteners have been used to secure attachment mechanisms directly to the helmet. Yet, previous helmet attachment mechanisms have comprised sharp edges and/or hooked shaped portions which may interfere with or even seriously injure a user. For instance, a hook portion may catch the shroud line of an opening parachute, cutting the line or violently jerking the user's head and neck. In order to prevent a shroud line from snagging on a helmet attachment mechanism, paratroopers have placed tape or a similar material over the mechanism before jumping and engaging their parachute. However, this is not desirable because it then requires removal of the tape before the night vision mount can be attached and a new piece of protection is required for each use of the helmet mount. Moreover, a suitable material may not always be available.

These and other problems exist with the helmet attachment mechanisms for night vision devices disclosed in the prior art. Consequently a need exists for an improved helmet attachment mechanism.

SUMMARY

The present invention, therefore, provides for a shroud plate to act as an interface between a helmet mount and a helmet. More particularly, the shroud plate of the present invention allows a helmet mount for a night vision device to be easily attached and removed from a helmet. Further, when the night vision device is not attached to the helmet, the shroud plate has no sharp edges or hook portions or any other type of crevice or opening on which an opening parachute shroud line may snag.

The present invention provides for a shroud plate for headgear comprising a shell, an insert, a lock and a release mechanism wherein the shell extends around at least a portion of the insert has a smooth surface with rounded edges and corners and is shaped to match the contour of the headgear. Further, the insert is adapted to receive a lock plate, the lock is adapted to secure the lock plate to the insert, and the release mechanism allows for removal of the lock plate from the insert.

DETAILED DESCRIPTION

Figure 1:
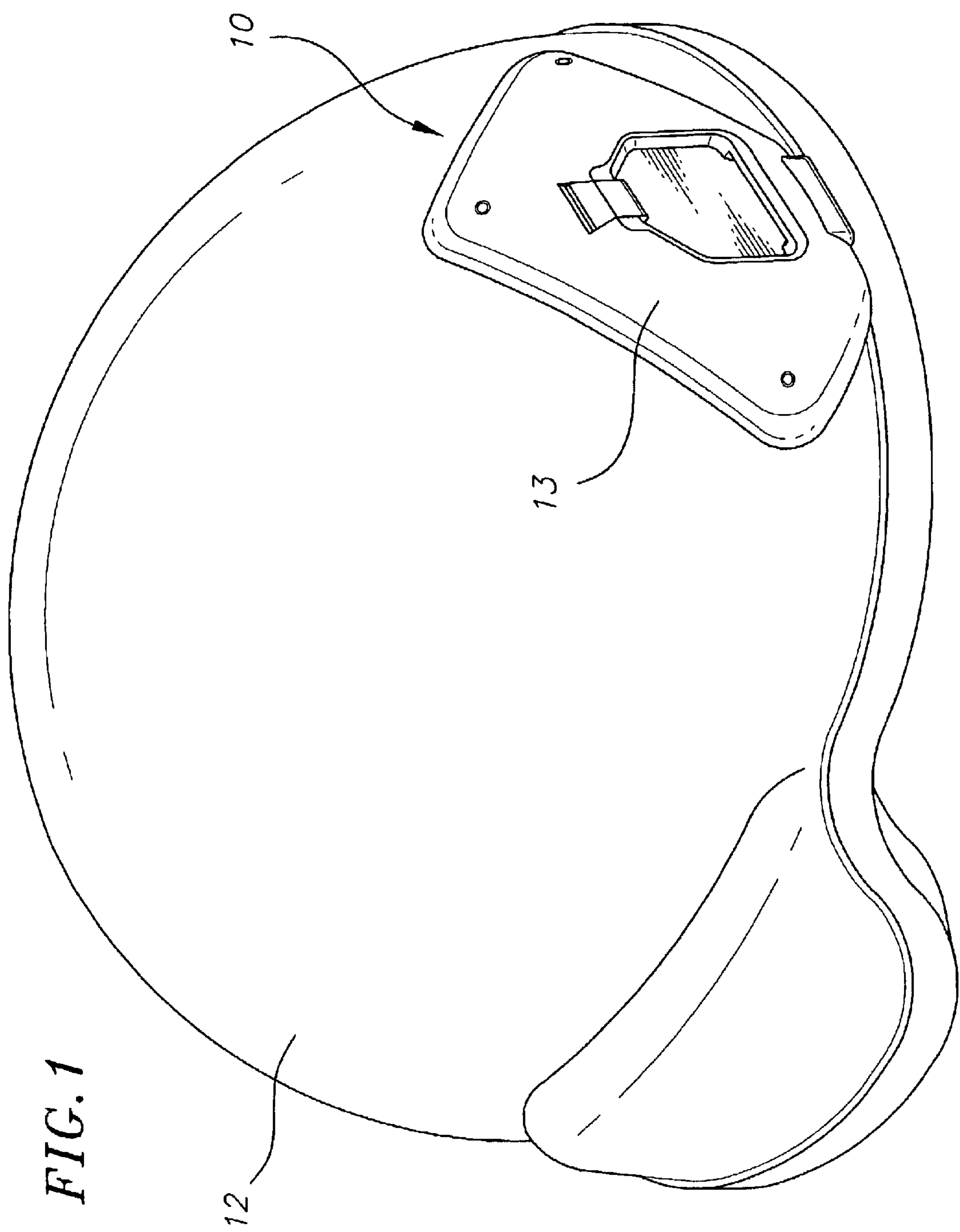
FIG. 1 is a perspective view of a shroud plate attached to a helmet.

An exemplary embodiment of the present invention is shown in FIG. 1. The shroud plate 10 is shown attached to a standard U.S. Army Kevlar composite helmet 12. The helmet is based on U.S. Design Pat. No. 449,411 to Largeot and is manufactured by CGF Helmets, Inc. of Akron, Ohio. In an exemplary embodiment, the shroud plate 10 may be attached to the helmet 12 by stainless steel screws 14 inserted into openings in the helmet 12 and shell 13. Flanged threaded inserts 15 may be driven into holes machined into shell 13. Threaded inserts 15 may also comprise a knurled outer surface in order to more securely attach them to the shell 13 when they are inserted into the machined hole. The threaded portion of the insert may also comprise two opposite halves attached to a flange at one end of the insert with a small gap separating the halves on their longitudinal axis. This separation allows the inserts to expand slightly when screws are threaded into them, tightly securing them to the shell 13. However, the shroud plate 10 may also be attached to the helmet 12 in any manner sufficient to secure a helmet attachment mechanism to the helmet 12 and support the accompanying helmet mount and night vision device. In the present invention, a shroud plate 10 may be retrofitted to any suitable helmet or other headgear, and it will be understood by those skilled in the art that the invention is not restricted to the helmet shown.

Figure 2:
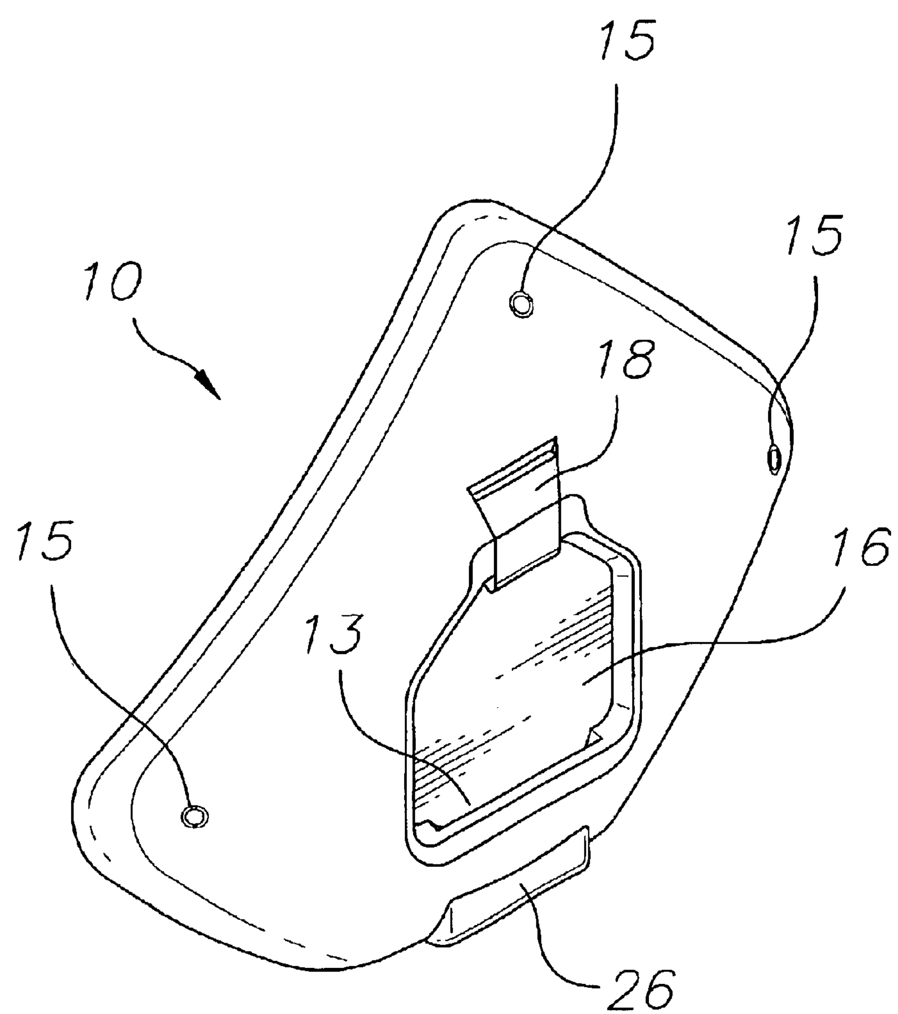
FIG. 2 is a perspective view of a shroud plate.

FIG. 2 shows a front side view of an exemplary embodiment of the present invention. The shroud plate 10 comprises a shell 13 which may be manufactured to fit the contour of a helmet. In one exemplary embodiment, the shell 13 may be machined from a block of nylon 6/6. However, the shell 13 may be manufactured from any suitable material sufficient to sustain the forces subjected to it during operation. The shell 13 may alternatively be injection molded from nylon 6/6 or a suitable polymer. When the shell 13 is injection molded, its walls are about $^{80}/_{1000}$ inch on all sides and the back side of the shell may comprise indented sections separated by support ridges. The indented sections allow the shell 13 to be a minimum weight while still providing a suitably sturdy base for the shroud plate 10. In addition to fitting the shell 13 to the contour of the helmet 12, the top surface of the shell 13 may be smooth with rounded edges and corners. Fitting the shell 13 to the shape of the helmet 12 and having a smooth surface with rounded edges and corners on the shell 13 ensures that there are no unnecessary edges on which another object, such as a shroud line of a parachute or a dangling tree branch in heavy foliage, may catch. The screws 14 which secure the plate 10 to the helmet 12 may be inserted from the inside of the helmet so that the heads of the screws are not exposed on the external surface. The length of the screws is such that the bodies of the screws 14 do not protrude beyond the external surface of the shell 13. The screws 14, however, should be long enough to securely attach the shell 13 to the helmet 12.

Figure 9:
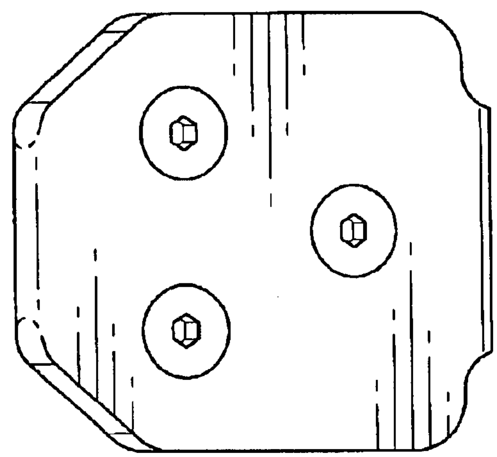
FIG. 9 is a perspective view of a lock plate.

An exemplary embodiment of the present invention further comprises an aluminum insert or receiving plate 16. The insert 16 could also be made of titanium or other suitable materials. The insert 16 is designed as a bay for a lock plate or adapter plate 17 (see FIG. 9) and functions as the interface between a helmet mount and a helmet 12. The shroud plate 10 may comprise an insert 16 that is integral with a shell 13 essentially making the plate one piece. The shroud plate 10 may comprise two integrally related pieces, the shell 13 and the insert 16, to optimize weight and durability. A lightweight shell minimizes the weight a user must bear while a durable lock plate ensures a sturdy interface between a helmet mount and a helmet. However, it is also possible that the shroud plate 10 may be one piece made from one material, for example all nylon or all aluminum.

In order to secure the lock plate 17, the base of the insert 16 may be indented from the top surface of the plate. Further, the insert 16 may comprise a hollowed indentation 19 on a side wall to fit a corresponding edge of the lock plate 17. The insert 16 may also comprise an opening in a side wall designed to accommodate a lock 18 which is slidably coupled to the insert 16.

Figure 4:
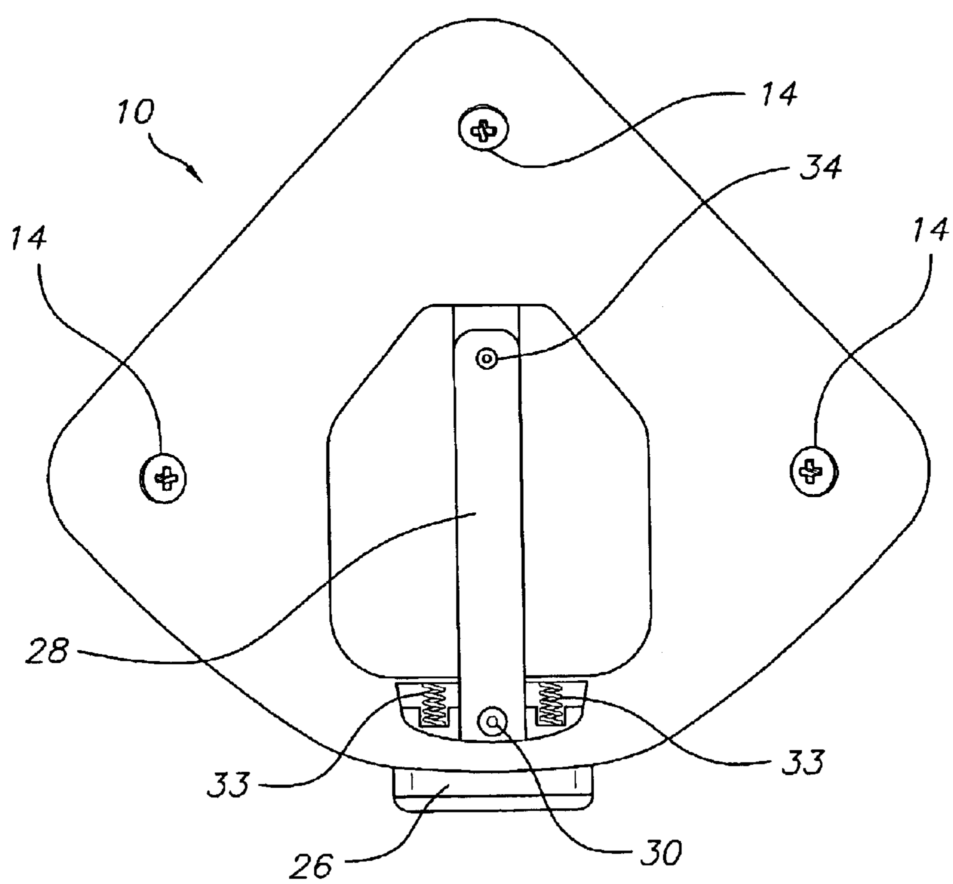
FIG. 4 is a back view of the shroud plate.
Figure 6:
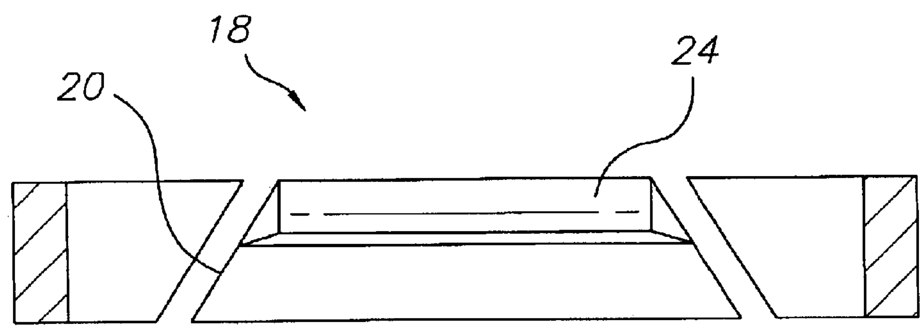
FIG. 6 is a bottom view of a lock.
Figure 7:
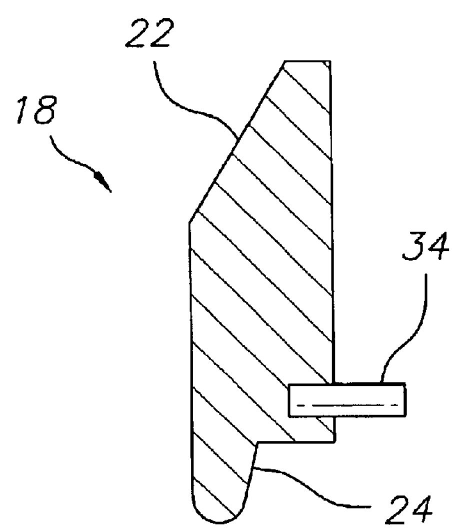
FIG. 7 is a side view of the lock.
Figure 8:
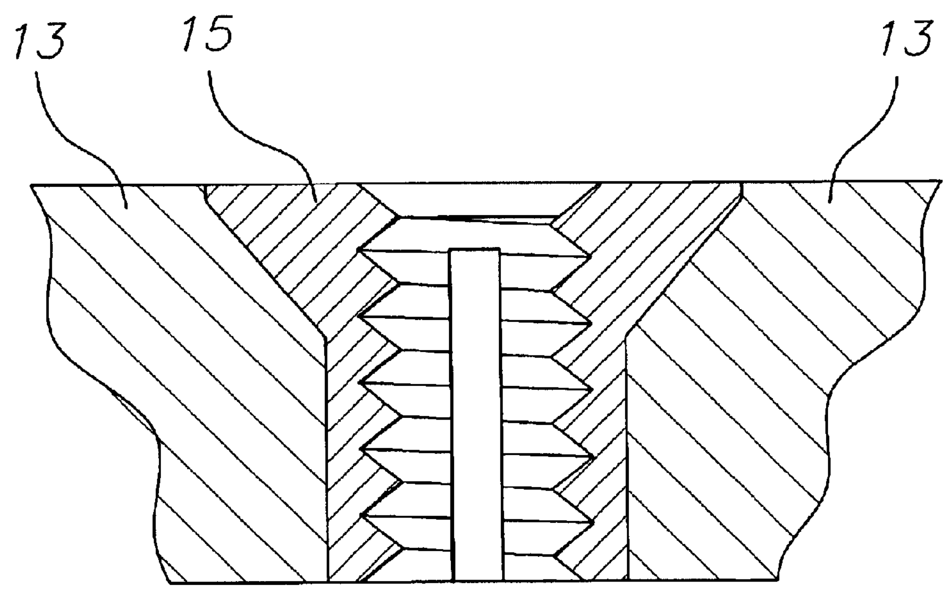
FIG. 8 is a side view of a flanged insert.
Figure 10:
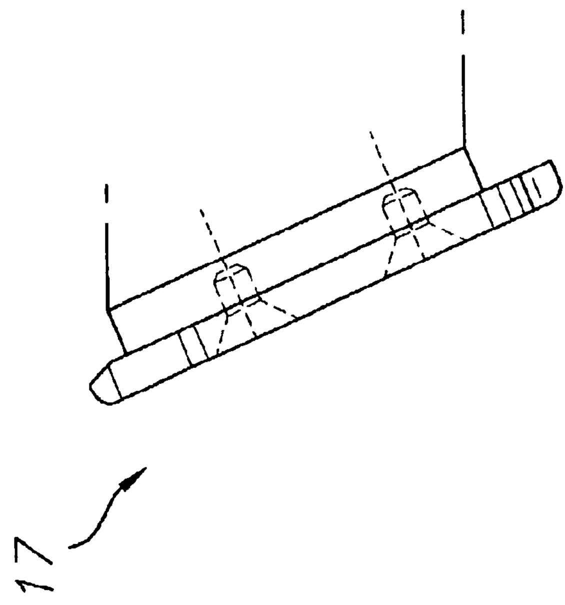
FIG. 10 is a side view of the lock plate.

As shown in FIG. 6, the sides 20 of the lock 18 may be tapered into a dovetail shape in order to secure the lock 18 to the insert 16 at the opening in the side wall, which opening has a mating dovetail shape. In a preferred embodiment, as shown in FIG. 7, the top surface 22 of the lock 18 is contoured to match that of the shell 13 in order to ensure a smooth surface. Also, in a further preferred embodiment, the rear of the lock 18 may comprise a tapered overhanging ledge 24 which serves to further secure the lock plate 17 when it is introduced into the insert 16. With further reference to FIG. 7, a protrusion 34 may extend from the bottom surface of the lock 18. Protrusion 34 allows for the lock 18 to be connected to release button 26 by a link plate 28 as shown in FIG. 4. Protrusion 34 may be attached to lock 18 by a threaded insert or by any other suitable means. Lock 18 may be connected to link plate 28 by a rivet, bolt, screw or any other appropriate means for attachment. In a preferred embodiment, the lock 18 may be machined from titanium. However, the lock 18 may also be manufactured from any other suitable material.

Figure 5:
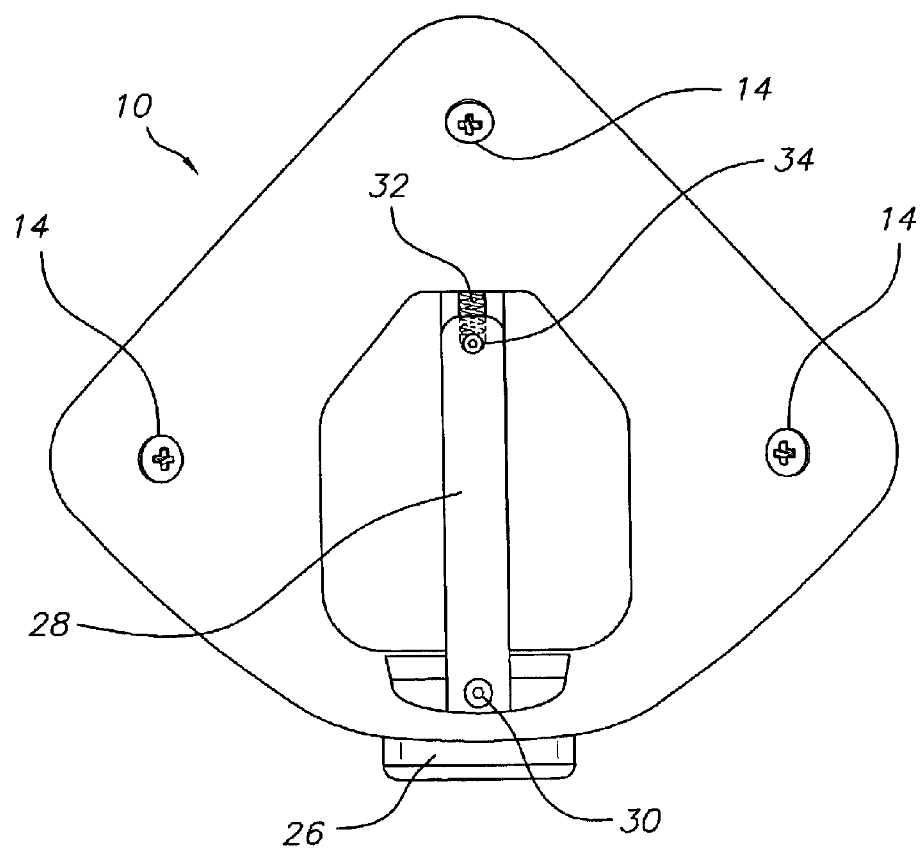
FIG. 5 is a back view showing an alternate embodiment of the shroud plate.

FIG. 4 shows a back side view of an exemplary embodiment of the present invention. Release button 26 may be attached to link plate 28 by a rivet, a bolt or a screw 30, or by any other means sufficient to secure them together. Release button 26 and link plate 28 may be machined from aluminum and titanium respectively in a preferred embodiment or any other suitable material. Link plate 28 may have drilled openings at either end to accommodate means for attaching release button 26 and lock 18 to it. The back surface of insert 16 may be contoured to the shape of the helmet 12, but may also contain a flat center channel which houses the link plate 28 and allows it to slide on a smooth surface. In a presently preferred embodiment, two springs 33 may be placed between the release button 26 and the rear of the insert 16 on opposite sides of the link plate 28. Springs 33 bias lock 18 to secure the lock plate 17 until release button 26 is pressed, thereby counteracting the bias of the springs 33, moving the lock 18 out of the way and allowing the night vision device to be removed. In an alternate embodiment, as shown in FIG. 5, a spring 32 may be placed between protrusion 34 on the lock 18 and a wall formed by the shell 13 where it meets the insert 16.

In operation, a user may attach a night vision device to the shroud plate 10 by fitting one edge of the lock plate 17 into the hollowed indentation 19 of the insert 16. In order to introduce the lock plate 17 to the insert 16, the user may press the lock plate 17 against the lock 18, forcing the lock 18 to displace enough to allow the lock plate 17 to become flush with the insert 16, a snap-lock action. A rounded front edge on the ledge 24 allows the lock plate 17 to displace the lock 18 upon insertion by a user. Tapered sides interface between the insert 16 and the lock plate 17 and also between the lock plate 17 and the lock 18. These tapered sides create a secure fit between the components. Further, the tapered top surface of the lock plate 17 matching the tapered ledge 24 should provide for automatic adjustment to normal wear between the mating surfaces. The user also may depress and hold the release button 26 which will move the overhanging ledge 24 of the lock 18 to allow insertion of the lock plate 17. Once the lock plate 17 is flush with the insert 16, the user may let go of the release button 26. Springs 33 will then cause the lock 18 and release button 26 to return to their original position, with the ledge 24 of the lock 18 securing the lock plate 17 to the insert 16. The tapered interface of ledge 24 prevents casual separation of the lock plate 17 from the insert 16 without displacement of the lock 18.

In order to release the night vision device from the insert 16, the user may depress and hold the release button 26. The ledge 24 of the lock 18 will again slide upward, allowing removal of the lock plate 17.

Figure 3:
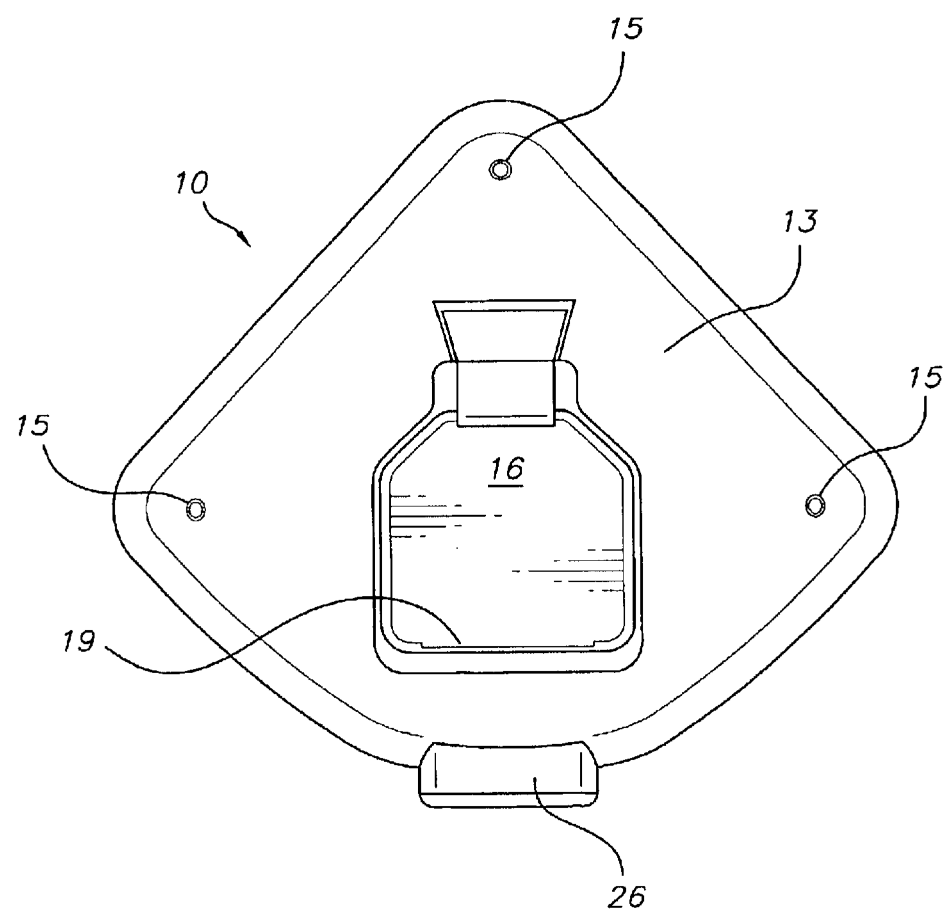
FIG. 3 is a front view of the shroud plate.

As shown in FIG. 3, the release button 26 is centrally located at the bottom of the shell 13, which allows the user to reach up in a natural motion and have their thumb in position to depress the release button 26 and thereby disengage the night vision device from the insert 16. Having a centrally located release button 26 further allows a right-handed or left-handed person the same ease of release. The release button 26 may also have rounded edges and a bottom edge contoured to match the rounded bottom edge of the shell 13. The lock 18 and release button 26 may be positioned opposite one another at different sides of the insert 16. Further, alternate arrangements of the lock 18 and release button 26 are possible. For instance, the release button 26 may be located adjacent to the lock 18.

While various embodiments of this invention have been shown and described, it would be apparent to those skilled in the art that many more modifications are possible without departing from the inventive concept herein. It is, therefore, to be understood that within the scope of the appended claims, this invention may be practiced otherwise than as specifically described.

I claim:

1. A shroud plate for headgear comprising a shell, an insert, a lock and a release mechanism wherein the shell extends around at least a portion of the insert and has a smooth surface with rounded edges and corners and is shaped to match the contour of the headgear;

the insert is adapted to receive a lock plate;

the lock is adapted to secure the lock plate to the insert; and the release mechanism allows for removal of the lock plate from the insert.

2. A shroud plate according to claim 1 wherein the release mechanism is a release button.

3. A shroud plate according to claim 2 wherein the release button is centrally located at the bottom edge of the shell.

4. A shroud plate according to claim 2 wherein the release button is shaped to match the contour of the bottom edge of the shell.

5. A shroud plate according to claim 1 wherein the shell is injection molded.

6. A shroud plate according to claim 5 wherein the shell is injection molded from nylon 6/6.

7. A shroud plate according to claim 1 wherein the shell further comprises indented sections separated by support ridges.

8. A shroud plate according to claim 1 wherein the shell is secured to a helmet by screws through the helmet into the shell.

9. A shroud plate according to claim 1 wherein the shell may further comprise threaded inserts, the inserts comprising a knurled outer surface and two opposite halves with a gap separating the halves on their longitudinal axis.

10. A shroud plate according to claim 1 wherein the sides of the lock are tapered in a dovetail shape.

11. A shroud plate according to claim 1 wherein the lock further comprises a ledge to secure the lock plate to the insert.

12. A shroud plate according to claim 1 wherein the headgear is a helmet.

13. A shroud plate according to claim 1 wherein the shell and the insert comprise one piece.

14. A shroud plate according to claim 1 wherein the top surface of the lock is contoured to match that of the shell.

15. A shroud plate according to claim 1 wherein the insert has tapered sides to receive a tapered lock plate.

16. A shroud plate according to claim 1 wherein the lock and the lock plate are titanium.

17. A shroud plate for headgear comprising a shell, an insert, a lock and a release button wherein the shell is adapted for attachment to the headgear and for supporting the insert;

the insert is adapted to receive a lock plate;

the lock is adapted to secure the lock plate to the insert; and the release button is centrally located along the bottom edge of the shell and allows for removal of the lock plate from the insert.

18. A shroud plate according to claim 17 wherein the shell has a smooth surface with rounded edges and corners and is shaped to match the contour of the headgear.

19. A shroud plate according to claim 17 wherein the release button is shaped to match the contour of the bottom edge of the shell.

20. A shroud plate according to claim 17 wherein the shell and the insert comprise one piece.

* * * * *

US006751810C1

(12) EX PARTE REEXAMINATION CERTIFICATE (7678th)

United States Patent
Prendergast

(10) Number: US 6,751,810 C1
(45) Certificate Issued: Aug. 10, 2010

(54) SHROUD PLATE

(75) Inventor: Jonathan R. Prendergast, Newport Beach, CA (US)

(73) Assignee: Norotos, Inc., Santa Ana, CA (US)

Reexamination Request:
No. 90/010,569, Jun. 26, 2009

Reexamination Certificate for:

| | |
|---|---|
| Patent No.: | **6,751,810** |
| Issued: | **Jun. 22, 2004** |
| Appl. No.: | **10/389,648** |
| Filed: | **Mar. 13, 2003** |

(51) Int. Cl.
*A42B 1/24* (2006.01)

(52) U.S. Cl. ............................ 2/422; 2/6.2; 248/222.13; 403/321

(58) Field of Classification Search ....................... 2/422
See application file for complete search history.

(56) References Cited

U.S. PATENT DOCUMENTS 4,195,328 A 3/1980 Harris, Jr.
4,907,296 A 3/1990 Blecha
5,339,464 A 8/1994 Dor
5,416,922 A 5/1995 Horvat et al.
5,534,213 A * 7/1996 Epling .................... 264/328.1
5,658,065 A * 8/1997 Jamieson .................... 362/106
6,234,058 B1 5/2001 Morgado

OTHER PUBLICATIONS

"Operator's Manual Night Vision Goggles AN/PVS–7B (NSN 5855–01–228–0937) (EIC: IPS) and AN/PVS–7D (NSN 5855–01–422–5413) (EIC:N/A)", pp. 1–12 and 2–54 to 2–58, by the Departments of the Army, the Navy, and the Air Force and Headquarters, Marine Corps, dated Dec. 1, 1997.

McMaster–Carr® Catalog, p. 2863, entitled "Threaded Inserts for Plastics and Wood", copyright 2000, McMaster–Carr Supply Company.

* cited by examiner

*Primary Examiner*—Jimmy T. Nguyen

(57) ABSTRACT

The present invention provides for a shroud plate for headgear comprising a shell, an insert, a lock and a release mechanism wherein the shell extends around at least a portion of the insert has a smooth surface with rounded edges and corners and is shaped to match the contour of the headgear. Further, the insert is adapted to receive a lock plate, the lock is adapted to secure the lock plate to the insert, and the release mechanism allows for removal of the lock plate from the insert.

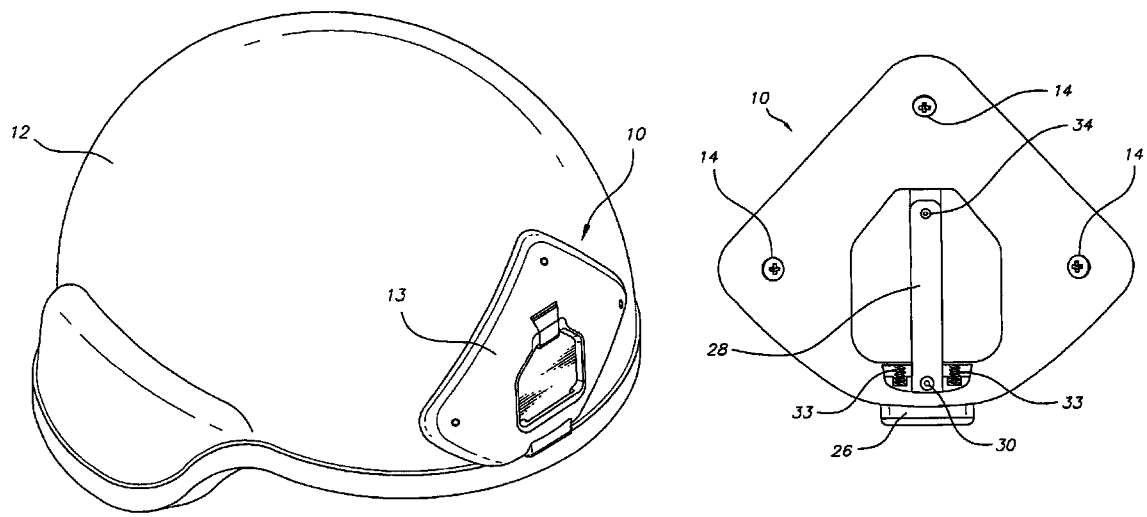

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5 and 7-17 are determined to be patentable as amended.

Claims 6 and 18-20, dependent on an amended claim are determined to be patentable.

New claims 21-23 are added and determined to be patentable.

1. A shroud plate for headgear comprising a shell, an insert, a lock and a release [mechanism] *button* wherein the shell extends around at least a portion of the insert and has a smooth surface with rounded edges and corners and is shaped to match the contour of the headgear;

the insert is adapted to receive a lock plate;

the lock is adapted to secure the lock plate to the insert; [and] the release [mechanism] *button* allows for removal of the lock plate from the insert*, and*

*the release button is centrally located at a bottom edge of the shell.*

2. A shroud plate according to [claim 1] *claim 22* wherein the release mechanism is a release button.

3. A shroud plate according to claim 2 wherein the release button is centrally located at [the] *a* bottom edge of the shell.

4. A shroud plate according to claim 2 wherein the release button is shaped to match the contour of [the] *a* bottom edge of the shell.

5. A shroud plate according to [claim 1] *claim 22* wherein the shell is injection molded.

7. A shroud plate according to [claim 1] *claim 22* wherein the shell further comprises indented sections separated by support ridges.

8. A shroud plate according to [claim 1] *claim 22* wherein the shell is secured to a helmet by screws through the helmet into the shell.

9. A shroud plate according to [claim 1] *claim 22* wherein the shell may further comprise threaded inserts, the inserts comprising a knurled outer surface and two opposite halves with a gap separating the halves on their longitudinal axis.

10. A shroud plate according to [claim 1] *claim 22* wherein the sides of the lock are tapered in a dovetail shape.

11. A shroud plate according to [claim 1] *claim 22* wherein the lock further comprises a ledge to secure the lock plate to the insert.

12. A shroud plate according to [claim 1] *claim 22* wherein the headgear is a helmet.

13. A shroud plate according to [claim 1] *claim 22* wherein the shell and the insert comprise one piece.

14. A shroud plate according to [claim 1] *claim 22* wherein the top surface of the lock is contoured to match that of the shell.

15. A shroud plate according to [claim 1] *claim 22* wherein the insert has tapered sides to receive a tapered lock plate.

16. A shroud plate according to [claim 1] *claim 22* wherein the lock and the lock plate are titanium.

17. A shroud plate for headgear comprising a shell, an insert, a lock and a release button wherein the shell is adapted for attachment to the headgear and for supporting the insert;

the insert is adapted to receive a lock plate; the lock is adapted to secure the lock plate to the insert; and the release button is centrally located along [the] *a* bottom edge of the shell and allows for removal of the lock plate from the insert.

*21. A shroud plate for headgear comprising a shell, an insert, a lock and a release mechanism,*

*wherein the shell extends around at least a portion of the insert and has an external surface that faces away from the headgear when the shroud plate is attached to the headgear, a back surface that faces toward the headgear when the shroud plate is attached to the headgear and a periphery;*

*wherein the external surface is smooth with rounded edges and corners at the periphery, such that the shell has no projections on which a shroud line may catch;*

*wherein the back surface is shaped to match the contour of the headgear such that at least the periphery of the shell fits to the headgear;*

*wherein the insert is adapted to receive a lock plate;*

*wherein the lock is adapted to secure the lock plate to the insert; and*

*wherein the release mechanism allows for removal of the lock plate from the insert.*

*22. A shroud plate for headgear comprising a shell, an insert, a lock and a release mechanism,*

*wherein the shell extends around at least a portion of the insert and has an external surface that faces away from the headgear when the shroud plate is attached to the headgear, a back surface that faces toward the headgear when the shroud plate is attached to the headgear and a periphery;*

*wherein the external surface is smooth with rounded edges and corners at the periphery, such that the shell has no projections on which a shroud line may catch and is shaped to match the contour of the headgear;*

*wherein the insert is adapted to receive a lock plate;*

*wherein the lock is adapted to secure the lock plate to the insert; and*

*wherein the release mechanism allows for removal of the lock plate from the insert.*

*23. A shroud plate for headgear comprising a shell, an insert, a lock and a release button,*

*wherein the shell is adapted for attachment to the headgear and for supporting the insert;*

*wherein the insert is adapted to receive a lock plate;*

*wherein the lock is adapted to secure the lock plate to the insert; and*

*wherein the release button is centrally located along a bottom edge of the shell, faces a rim of the headgear when the shroud plate is attached to the headgear, and allows for removal of the lock plate from the insert.*

* * * * *